United States Patent Office 3,240,559
Patented Mar. 15, 1966

3,240,559
METHOD OF RECOVERING A FLUORAPATITE CONCENTRATE
James A. Barr, Jr., 535 W. Palm Drive, Lakeland, Fla.
No Drawing. Filed May 16, 1963, Ser. No. 281,061
6 Claims. (Cl. 23—108)

This is a continuation-in-part of my copending application Serial Number 76,137, filed December 16, 1960, now abandoned.

This invention relates to fluorapatite. In one specific aspect it relates to the recovery of fluorapatite from a phosphatic limestone in which the fluorapatite is present as a dispersion in a calcite matrix.

In summary this invention is directed to a method for recovering a fluorapatite concentrate from fluorapatite-containing phosphatic limestone which comprises treating said limestone under positive pressure and in the substantial absence of air with an aqueous solution maintained saturated with sulfur dioxide, continuing said treatment for a sufficient period of time to dissolve substantially all of the calcium carbonate in said limestone, and separating and recovering the undissolved concentrated fluorapatite solids.

Preferred embodiments of my process include comminution of the phosphatic limestone to about 10–40 mesh U.S. standard before treating with aqueous $SO_2$, the use of pressures of about 10–40 p.s.i.g., and the recovery and reuse of $SO_2$.

In one embodiment of my process the phosphatic limestone is calcined, thereby converting the major portion of the calcium carbonate matrix of said limestone to quicklime, or lime (CaO). A major portion of the thus produced lime is removed by elutriation techniques before treating the calcined material with $SO_2$ solution, thereby reducing the amount of $SO_2$ consumed in the fluorapatite concentration process.

A considerable amount of phosphate mineral, usually as fluorapatite, is used in the production of phosphoric acid, metal phosphates, organic phosphorous compounds, and superphosphate fertilizers. A major portion of this phosphate mineral is recovered from phosphate deposits as so-called pebble phosphate. While there are large deposits of pebble phosphate in certian sections of the world, they are being consumed at a rapid rate. With an eye to the future, it is necessary that other sources of phosphate be developed.

It is known that there are enormous amounts of phosphate in deposits of phosphatic limestone which comprise phosphate particles (frequently fluorapatite) in a solid calcite matrix. Fluorapatite-containing phosphatic limestone cannot be utilized in the ordinary acidulation process of recovering phosphate from ores, because the calcite reacts readily with sulfuric acid to form gypsum which is of little value in comparison with the amount of acid consumed. For this reason, previous to my invention, phosphatic limestone has not been economically competitive with pebble phosphate.

My invention, which is based on the surprising discovery that fluorapatite, unlike other phosphate minerals, is insoluble in saturated aqueous solutions of sulfur dioxide at pressures from about 5–45 p.s.i.g., makes it both possible and practical to recover fluorapatite, in high yield and purity, from fluorapatite-containing phosphatic limestone without the use of large quantities of acid.

The importance and advantages of my discovery are best understood when considered in the light of the rationale and current status of the general knowledge concerning the action of aqueous sulfur dioxide on phosphate ores.

The fact that aqueous sulfur dioxide dissolves calcium carbonate has long been known and used to prepare "sulfite liquor" for the paper industry. The use of aqueous sulfur dioxide to dissolve calcite, and similar carbonates, from ores is well known. (See Lerner, U.S. Patent 3,025,131 and Canadian Patent 632,347.) However, previous to my discovery it was considered impossible to use saturated aqueous solutions of sulfur dioxide under pressure to separate the calcite impurity from phosphate ores, because both the calcite and the phosphate were dissolved. This is taught by Designolle (U.S. Patent 196,881), Negev Phosphates Limited (British Patent 831,916), Gruenstein (Israel patent specification 10,259). Others to the same effect include Hughes and Cameron (Ind. Eng. Chem. 23, 1262–71), Blumenberg (U.S. Patents 1,251,741 and 1,588,651), Sadtler (U.S. Patent 1,326,533), Bergmann (U.S. Patent 852,372).

I have found that fluorapatite, unlike other phosphate minerals including tricalcium phosphate, hydroxylapatite, and carbonate-apatite, is not dissolved when treated with saturated aqueous solutions of sulfur dioxide at about 10–40° C. and at pressures of about 5–45 p.s.i.g.

In view of my discovery, the inoperability of the prior processes evidently lay in the fact that a sulfur dioxide-soluble form of phosphate, e.g., tricalcium phosphate, was being treated, whereas I have found that the phosphate must be in the form of fluorapatite to permit a separation with $SO_2$.

Pure fluorapatite analyzes substantially 42.2% $P_2O_5$ and 3.8% F. It has a formula weight of 1008.6 which conforms to the empirical formula $Ca_{10}F_2(PO_4)_6$, and it is a valuable source of phosphate fertilizer.

In my process, phosphatic limestone is treated with aqueous sulfur dioxide, thereby liberating $CO_2$ gas from the calcite matrix, dissolving the calcite matrix, and leaving fluorapatite as an insoluble residue. Substantially all of the iron and aluminum phosphate present in the phosphatic limestone are dissolved by the aqueous sulfur dioxide. While this represents a loss of $P_2O_5$, it is advantageous if the fluorapatite is to be used in the manufacture of phosphoric acid, because iron and aluminum contaminate phosphoric acid and complicate its clarification. If the iron or aluminum content is high, there will be a corresponding high loss of phosphate. The siliceous material present in phosphatic limestone is quite insoluble in aqueous sulfur dioxide; hence, the fluorapatite will be contaminated with said insoluble siliceous material. Most of the siliceous material can be separated from the fluorapatite by conventional flotation techniques. However, if the siliceous material does not interfere with the subsequent use of the fluorapatite, its presence can be ignored.

In carrying out the present invention, the aqueous medium is maintained saturated with $SO_2$ at all times. This is done by conducting the reaction in a closed system under slight pressure (about 5–45 p.s.i.g.). Fresh $SO_2$ is passed into the system continuously and the system is continuously vented to allow the escape of $CO_2$ formed in the reaction. The reaction mass should preferably be stirred to insure intimate contact between the $SO_2$ and the calcite. Heating the reaction mixture will speed the reaction, but it lowers the amount of $SO_2$ in solution which has the reverse effect. The reaction can very conveniently be carried out at a temperature of about 10–40° C. without the use of specialized equipment.

Phosphatic limestone of the type used as starting material herein is usually mined as rock and frequently contains 30–60% calcium carbonate. In one embodiment of my process, the rock is calcined to drive off carbon dioxide and form free lime (CaO). When using this technique, I prefer to calcine the phosphatic limestone until substantially all of the calcite matrix has been converted to lime and carbon dioxide. Nevertheless, this is a matter of economics and convenience rather than necessity, because highly beneficial results are obtained when the calcination is terminated before the decomposition of the calcite matrix is substantially complete. Since phosphatic limestone usually contains silica, care must be used in calcining this material. If temperatures above about 1300° C. are used, defluorination of the fluorapatite component of the phosphatic limestone can occur, thereby rendering the phosphate residue soluble in aqueous sulfur dioxide. If temperatures below about 950° are used, the rate of evolution of carbon dioxide from the calcite matrix is too slow to be economically attractive. Absorption of moisture by the free lime causes the rock to disintegrate. A large amount of the free lime is removed by elutriation with water, and the remaining solid is treated with aqueous sulfur dioxide in accordance with the present invention to dissolve the remaining calcium carbonate or lime. This produces a higher concentration of fluorapatite than can be achieved by repeated calcining and elutriation.

For treatment in accordance with my invention, it is not necessary that the rock be calcined initially, especially if the calcium carbonate content is low. For treatment in this process the rock is preferably ground to a particle size of about 10–40 mesh U.S. standard. A coarser grind can be used but the reaction is slower. It is generally not necessary to grind the rock finer than about 40 mesh.

I prefer to use sufficient water in preparing the rock slurry to dissolve all soluble products formed in the subsequent reaction. Thus, the exact amount of water required depends on the calcium carbonate content of the rock.

When the rock is slurried with a solution of sulfurous acid instead of water the reaction commences a little sooner and this technique will reduce the total reaction time. However, it is entirely feasible to commence the reaction by slurrying ground rock in water and passing $SO_2$ into the system. Once initiated, the reaction proceeds rapidly and provision must be made to vent the $CO_2$ formed to avoid a rapid build-up of pressure in the vessel. When the evolution of $CO_2$ ceases, the reaction is complete. Unless sufficient water to dissolve all soluble products is used, some soluble material will remain with the fluorapatite in the solid state. If the solid is kept out of contact with the air and is washed promptly, any calcium bisulfite present will be removed with the wash water. However, contact with air oxidizes calcium bisulfite to calcium sulfate which is insoluble.

I prefer to recover the dissolved sulfur dioxide from the mother liquor by sparging with an "inert" flushing gas. (As used here, the term "inert" means any gas that does not oxidize sulfur dioxide, sulfite, or bisulfite present in the solution.) This preference is based upon the fact that calcium bisulfite decomposes according to the equation:

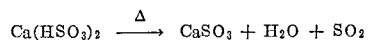
$$Ca(HSO_3)_2 \xrightarrow{\Delta} CaSO_3 + H_2O + SO_2$$

Decomposition of calcium bisulfite solution occurs readily at the boiling point and slower at lower temperatures. Thus, any hot non-oxidizing gas (including $N_2$, $CO_2$, and $SO_2$) can be used as both flushing agent and heat source. Nevertheless, other methods of heating, including steam coils and the like, can be used.

The solid residue from the present treatment can be separated into a relatively coarse fraction and relatively fine fraction. The $P_2O_5$ content of the coarse material can be as high as about 38% and of the fine fraction is frequently somewhat less, usually, about 35%. As stated previously, the theoretical $P_2O_5$ content of fluorapatite is 42.2%.

The present invention is further illustrated by the following examples which are illustrative only and are not intended to limit the scope of my invention.

*Example I*

An authenticated sample of fluorapatite analyzing 42.25% $P_2O_5$ and 3.75% F was ground to minus 30 mesh U.S. standard. A 100 gram portion of this material was mixed with 500 ml. of water and placed in a bomb equipped with a stirrer. The system was flushed with gaseous $SO_2$; then $SO_2$ was added until the pressure was 40 p.s.i.g. The slurry was stirred gently while maintaining the temperature of the system at 28–30° C. No excess pressure was generated. At the end of 1 hour, the pressure was released, the fluorapatite was recovered, washed, dried (ca. 110° C.), and weighed. The dried product weighed 99.7 grams and analyzed 42.13% $P_2O_5$ and 3.69% F. These results show that fluorapatite is insoluble in a saturated aqueous solution of $SO_2$.

*Example II*

A phosphatic limestone composed of fluorapatite in a calcite matrix and having a $P_2O_5$ content of 26.2% was ground to minus 20 mesh U.S. standard. A 104 g. portion of this material was mixed with 400 ml. of water and was placed in a bomb equipped with a stirrer. Pressure was raised by addition of gaseous $SO_2$ to about 30 pounds. Excess pressure generated by the reaction was released through a vent. A total of 82 grams of $SO_2$ was added while the mixture was agitated. On completion of the reaction, the pressure was released and the slurry was poured onto a filter. The solid residue was washed and dried. It was found to contain 36.0% $P_2O_5$ and weighed 71.4 grams. Silica content was less than 5%. This represents a recovery of about 94.5% of the fluorapatite.

*Example III*

A 100 gram portion of a fluorapatite-containing limestone (analyzing 1.3% $P_2O_5$) was ground to minus 28 mesh U.S. standard and then treated in a closed but vented vessel with 450 ml. of water and 120 grams of $SO_2$ at 20 p.s.i.g. pressure for an hour. The $SO_2$ was added continuously to maintain the aqueous system saturated with $SO_2$ at all times. The reaction mixture was filtered, washed, and dried. A fluorapatite concentrate analyzing 27.5% $P_2O_5$, weighing 65 g., and containing a high acid insoluble residue—probably silica—was recovered. The acid reactable content of the concentrate was substantially equivalent to its fluorapatite content.

*Example IV*

100 grams of ground (minus 28 mesh) phosphatic limestone, composed of fluorapatite in a calcite matrix, was calcined, in a furnace, to constant weight. This material analyzed 26.4% $P_2O_5$ before calcination and 30.1% after calcination. This material was treated in a closed system for 90 minutes with a total of 94 grams of $SO_2$ at 30 pounds pressure in the manner described in Example II. The 77.6 grams of fluorapatite solid analyzed 37.3% $P_2O_5$. This represents a recovery of about 93.4%.

*Example V*

Calcined phosphate rock from the Fomento Minero (Mexico) pilot plant was used to demonstrate the effect of $SO_2$ on calcined rock. This material had been calcined to convert the calcium carbonate to lime, washed to remove lime, and re-treated to remove additional lime and then ground. Analysis showed the following components:

| | Percent |
|---|---|
| $P_2O_5$ | 30.0 |
| $CaCO_3$ | 13.0 |
| $Ca(OH)_2$ | 2.0 |

A 50 gram portion of this material was placed in a closed pressure vessel and mixed with saturated $H_2SO_3$ solution in excess of that required to react with the free lime. The pressure was adjusted to and maintained at about 40 p.s.i.g., by adding $SO_2$ as required. When the reaction was complete, the excess $SO_2$ was vented from the vessel. The reaction mass was filtered and washed. Analysis of the solid residue showed it to contain 33.5% $P_2O_5$. This represents an appreciable upgrading of the rock. On analysis, the filtrate and washings were found to contain less than 0.2% $P_2O_5$. This shows that there was no appreciable loss of $P_2O_5$ during my treatment.

*Example VI*

A sample of fluorapatite-containing phosphatic limestone from Mexico was crushed to −10 mesh (U.S. standard), analyzed, calcined at about 980° C., analyzed, and subjected to hydraulic concentration (elutriation with water). A sample of the thus produced concentrate was dried at about 115° C. and analyzed. A 50 gram portion of said concentrate was placed in a closed pressure vessel and treated with aqueous $SO_2$ according to the method of Example V. The solid residue from the $SO_2$ treatment was analyzed. Results presented in the following table represent a recovery of about 84% of the $P_2O_5$ based on the $P_2O_5$ content of the calcined ore.

These data show that the process gives high recoveries of even very low grade (ca. 15% $P_2O_5$) ores.

|  | Original Ore | Calcined Ore | Hydraulic Concentrate | Solid Residue from $SO_2$ Treatment |
|---|---|---|---|---|
| $P_2O_5$, percent | 15.5 | 21.2 | 27.3 | 32.5 |
| CaO, percent | 51.6 | 68.9 | 56.7 | 49.1 |
| $CO_2$, percent | 17.7 | 1.0 | | |
| Weight Ratio, CaO:$P_2O_5$ | 3.33 | 3.25 | 2.08 | 1.51 |

What is claimed is:

1. A method of recovering a fluorapatite concentrate from fluorapatite-containing phosphatic limestone, analyzing 30–60% calcium carbonate, comprising treating said limestone, in a vented system in the substantial absence of air, with an aqueous solution maintained saturated with sulfur dioxide at a pressure of about 5–45 pounds per square inch gauge and at a temperature of about 10–40° C., until the evolution of carbon dioxide ceases while continuously venting the system to allow the escape of carbon dioxide formed in the reaction, whereby substantially all of the calcium carbonate of said limestone is dissolved, separating, and washing the undissolved solid in the substantial absence of air to provide a washed fluorapatite concentrate, and recovering said concentrate.

2. A method of recovering a fluorapatite concentrate from fluorapatite-containing phosphatic limestone, analyzing 30–60% calcium carbonate, comprising treating said limestone, in a vented system in the substantial absence of air, with an aqueous solution maintained saturated with sulfur dioxide at a pressure of about 5–45 pounds per square inch gauge and at a temperature of about 10–40° C., until the evolution of carbon dioxide ceases, while stirring the resulting mixture to insure intimate contact between the reactants, and continuously venting the system to allow the escape of carbon dioxide formed in the reaction, whereby substantially all of the calcium carbonate of said limestone is dissolved, separating, and washing the undissolved solid in the substantial absence of air to provide a washed fluorapatite concentrate, and recovering said concentrate.

3. The method according to claim 1 in which the fluorapatite-containing phosphatic limestone is comminuted to about 10–40 mesh U.S. standard before treating said limestone with aqueous sulfur dioxide.

4. The method according to claim 1 in which the fluorapatite-containing phosphatic limestone is calcined at about 900–1300° C., whereby the calcite matrix is converted to free lime, and elutriating the calcined product with water to remove the thus formed free lime before treating the calcined material with aqueous sulfur dioxide.

5. The method according to claim 1 in which the pressure is about 10–40 pounds per square inch gauge.

6. The method of claim 1 in which sufficient water is used to dissolve all soluble products formed in the reaction.

References Cited by the Examiner

UNITED STATES PATENTS

| 196,881 | 11/1877 | Designolle | 71—37 |
| 283,427 | 8/1883 | Scribner | 71—38 |
| 1,251,741 | 1/1918 | Blumenberg | 71—38 |
| 1,326,533 | 12/1919 | Sadtler | 71—38 |
| 1,413,048 | 4/1922 | Matheson | 71—38 |
| 1,588,651 | 6/1926 | Blumenberg | 71—35 |
| 2,865,710 | 12/1958 | Le Baron | 23—108 |

BENJAMIN HENKIN, *Primary Examiner.*

MAURICE A. BRINDISI, *Examiner.*